United States Patent [19]
Levin

[11] 3,895,213
[45] July 15, 1975

[54] ELECTRICAL DEFROSTING CIRCUIT FOR VEHICLE GLASS

[75] Inventor: Berton P. Levin, Santa Monica, Calif.

[73] Assignee: The Sierracin Corporation, Sylmar, Calif.

[22] Filed: May 10, 1974

[21] Appl. No.: 468,671

Related U.S. Application Data

[63] Continuation-in-part of Ser. No. 325,514, Jan. 22, 1973, abandoned.

[52] U.S. Cl. .................. 219/203; 52/171; 219/484; 219/522; 219/543; 219/547
[51] Int. Cl. ........ H05b 1/02; H05b 3/26; E06b 7/12
[58] Field of Search ........... 219/202, 203, 522, 543, 219/547, 279, 213, 483, 484, 476–480; 52/171

[56] References Cited
UNITED STATES PATENTS
| | | | |
|---|---|---|---|
| 3,288,983 | 11/1966 | Lear | 219/203 X |
| 3,475,588 | 10/1969 | McMaster | 219/203 |
| 3,752,348 | 8/1973 | Dickason et al. | 219/203 |
| 3,794,809 | 2/1974 | Beck et al. | 219/203 |

FOREIGN PATENTS OR APPLICATIONS
1,206,194  9/1970  United Kingdom .................. 219/203

*Primary Examiner*—A. Bartis
*Attorney, Agent, or Firm*—Christie, Parker & Hale

[57] ABSTRACT

A laminated, electrically heatable windshield has a transparent electrically conductive layer embedded in the window, the layer being divided into two electrically isolated areas to form two separate electrical loads. A frit-line heated backlite of much lower resistance is connected in series with one section of the windshield, the two resistors in series forming one load connected to a three-phase alternator. The other half of the windshield forms a second load connected to another phase of the three-phase alternator. The two loads may be connected either as two legs of a delta connection (coil to coil) or connected with the series circuit load as one leg of a delta connection and the remaining half windshield load connected between the neutral point and one coil of a Y-connected rotor. In a further modification the backlite is connected as the load across one winding of a three-phase alternator and the windshield is connected as a single load across the other two windings connected in series.

15 Claims, 5 Drawing Figures

ELECTRICAL DEFROSTING CIRCUIT FOR VEHICLE GLASS

RELATED CASES

This application is a continuation-in-part of application Ser. No. 325,514 filed Jan. 22, 1973, now abandoned.

BACKGROUND OF THE INVENTION

It has become highly desirable to provide electrical heating in windows of automobiles for removing accumulations of ice and snow and inhibiting condensation of fog and frost. One type of such electrically heatable window for automobiles has a very thin conductive metal film laminated within the window and extending over most of the area of the window. The metal film is sufficiently thin that it is transparent and when a voltage is applied between opposite edges, it serves as a sheet resistor for conducting current. Since the resistive heating layer extends over most of the area of the window, much more uniform heating is obtained than with discrete wires or other conductors embedded in the window.

Typically, such an electrical heatable window has the thin metal film vacuum deposited on a carrier film of transparent plastic, such as polyethylene terephthalate. The carrier film is sandwiched between a pair of polyvinyl butyral interlayers which are in turn sandwiched in between the face sheets of glass. Electrically conductive bus bars, typically of thin copper foil, are laminated into the heatable window between the carrier film and interlayers so as to be in electrical contact with the thin conductive film. Electric current applied between bus bars along opposite edges of conductive areas within the window assures uniform heating over the area of the window.

Because the backlite or rear window is normally not made of laminated construction, it is more practical and less expensive to utilize a glass on which is applied a plurality of resistive heating conductors in the form of frit lines which are applied to the surface of the glass. The frit lines are made from a glass or ceramic frit material containing dispersed metal products. When the frit is fired, the material forms a hard glass-like substance with relatively low electrical resistance properties. The parallel lines are electrically connected in parallel by a pair of bus bars extending along opposite edges of the glass and electrically joining the respective ends of the frit lines.

To achieve effective de-icing with such a windshield installation, the power required is rather substantial. It has been the practice in the past to utilize a separate alternator as an electrical power source for the windshield. The alternator is typically operated with AC voltages of 80 to 100 volts. Also, because three-phase alternators are more efficient than single-phase alternators, it has been proposed to arrange the windshield and backlite as three separate loads for each phase of a three-phase alternator. However, using the backlite as one of the loads of the three-phase alternator, as heretofore proposed, presents a problem because the frit lines normally present a substantially lower resistance load than the laminated conductive layer construction of the windshield. In addition, because the frit lines are exposed on the surface of the glass in the backlite, contact with the frit lines operating at these higher voltages can present a substantial health hazard, particularly to small children.

SUMMARY OF THE INVENTION

The present invention is directed to a circuit arrangement for connecting up the laminated layer of the windshield and the frit lines of the backlite to a three-phase alternator so as to get substantially higher power dissipation in the windshield and much lower voltage gradient along the frit lines. In brief, this is achieved by dividing the conductive layer of the windshield into two separate sections which are electrically isolated from each other. One section is series connected with the load presented by the frit lines of the backlite. This series circuit is connected across one phase (coil to coil) of the three-phase alternator. The other half of the windshield is connected across a second phase of the three-phase alternator. The third phase of the alternator has an open circuit condition. It has been found that even though loads on the two phases may be substantially the same, the division of power is substantially greater in one phase load than in the other phase load, depending upon the direction of rotation of the alternator. Furthermore, by this arrangement, the voltage drop across the frit lines of the backlite is only a fraction of the total voltage generated across one phase of the alternator.

In an alternative embodiment, the backlite is connected as a single load across one winding of the three-phase alternator while the windshield is connected as a single load across the other two windings in series. The low resistance of the backlite draws sufficient current that the internal resistance of the winding drops the voltage across the terminals to the backlite to a safe level.

BRIEF DESCRIPTION OF THE DRAWINGS

For a more complete understanding of the invention, reference should be made to the accompanying drawings wherein.

DETAILED DESCRIPTION

Figure 1:
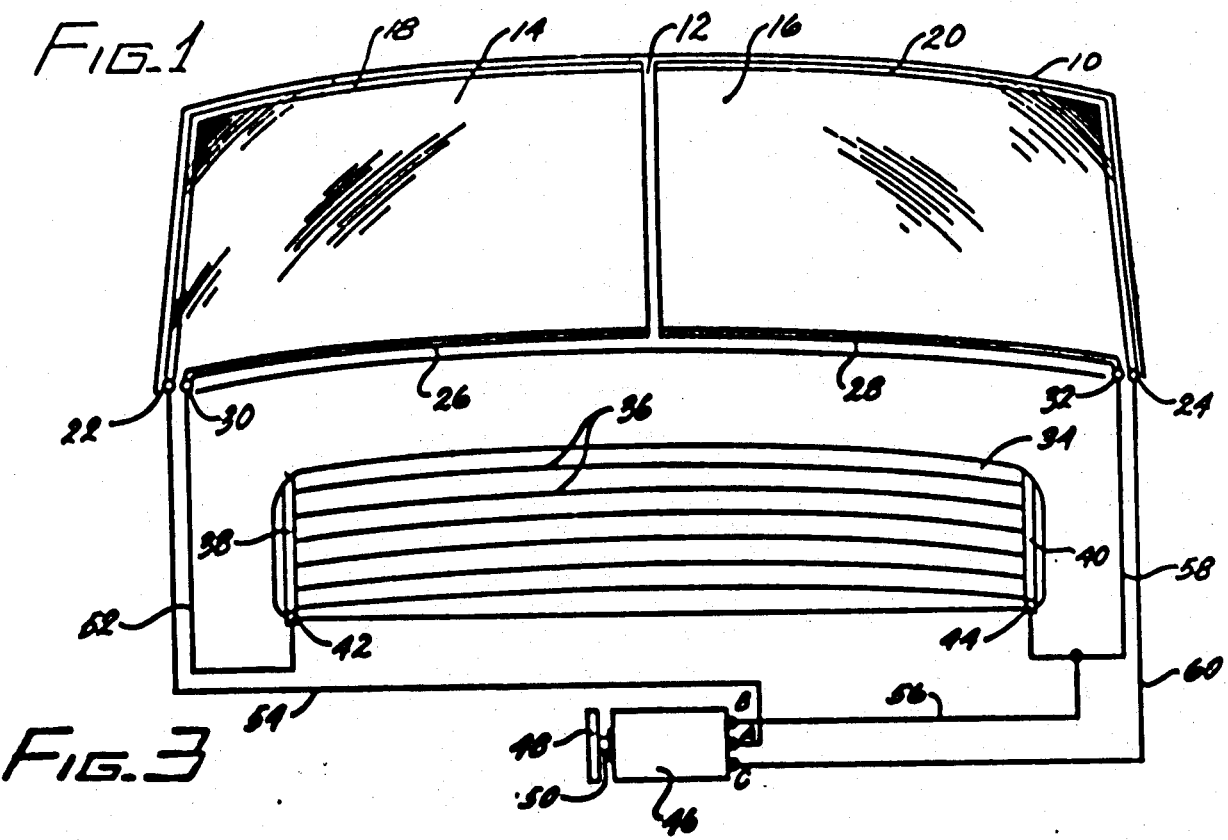
FIG. 1 illustrates in partially schematic form a typical electrically heatable windshield and backlite system according to the present invention.

Referring to FIG. 1, the numeral 10 indicates generally an automobile windshield made of laminated glass. Between the laminations, an electrically conductive layer of vacuum-deposit metal, such as gold, is provided which is sufficiently thin to be transparent and yet which is electrically conductive. The electrically conductive layer is interrupted along a narrow vertical path 12 near the center of the windshield, thus dividing the conductive layer into two electrically isolated sections 14 and 16 corresponding respectively to the passenger side and the driver side of the windshield.

Copper foil bus bars 18 and 20 are embedded in the laminated glass, the bus bar 18 contacting the upper margin of the conductive layer section 14 and extending to a terminal 22 in the lower corner of the windshield. Similarly the bus bar 20 contacts the upper margin of the conductive layer section 16 and extends to a terminal 24 in the opposite lower corner of the windshield. Similarly, copper bus bars 26 and 28, respectively, extend along the lower margin of the conductive layer sections 14 and 16 and terminate respectively in terminals 30 and 32 at the opposite lower corners of the windshield. The construction of the bus bars is described in more detail in U.S. Pat. No. 3,612,745.

The automobile backlite, indicated at 34, is usually constructed of a single thickness of tempered glass. To heat the glass, it is conventional to provide a plurality of thin parallel conductive lines made of a glass or ceramic frit in which is embedded or dispersed conductive materials such as silver. The frit lines, indicated at 36, are joined at their respective ends by a pair of bus bars 38 and 40. These bus bars terminate at the margin of the glass in suitable terminals 42 and 44. The frit lines and associated bus bars are formed on the surface of the glass, preferably on the inside surface of the backlite. Thus the lines are exposed to contact by persons touching the glass. The temperature level during heating mode is not sufficient to cause any problem and where operated with the usual 12-volt electrical system, there is no shock hazard with such conventional electrically heated backlites.

Power is provided for heating the windshield and backlite by a three-phase alternator 46 driven off the engine (not shown) of the automobile by means of a V-belt pulley 48 and driveshaft 50. The three-phase alternator 46 may, for example, be a Motorola Model No. 8TD2X 01K tandem three-phase alternator. The alternator 46 has three output terminals A, B, and C. The electrical load provided by the conductive layer in the section 14 of the windshield is connected in series with the load provided by the frits 36 of the backlite by means of the conductor 52 extending between terminal 30 and terminal 42. This series circuit in turn is connected across one phase of the alternator output, as by means of conductors 54 and 56. Conductor 54 connects terminal A of the alternator to the terminal 22 of the windshield section 14, while conductor 56 connects terminal B of the alternator to terminal 44 of the backlite 34. The other section 16 of the windshield 10 has its terminals 24 and 32, respectively, connected to terminals B and C of the alternator 46 by conductors 58 and 60.

Figure 2:
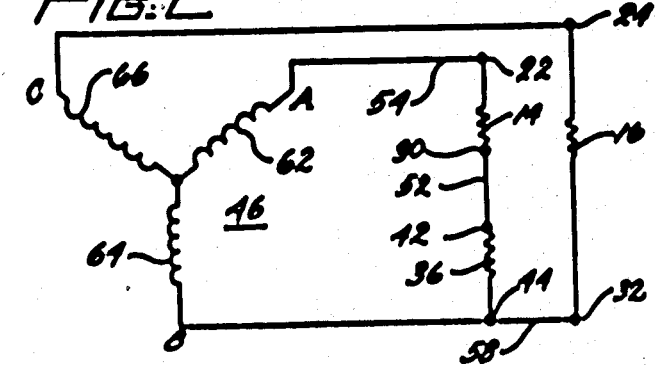
FIG. 2 is a schematic circuit diagram of one embodiment of the invention.

The circuit diagram is shown schematically in FIG. 2. The alternator 46 has three windings 62, 64, and 66 connected in a standard Y-configuration. The load provided by the series resistances of the section 14 and frit lines 36 is connected as one leg of a delta load connection across terminals A and B, while the resistor formed by section 16 is connected as the second leg of a delta connection. This configuration therefore may be referred to as an incomplete delta, since the third leg of the delta is an open circuit between terminals B and C.

A typical value for the effective load resistance of the frit lines 36 is usually less than an ohm, whereas a typical resistance of the conductive layer sections of the windshield may be of the order of 5 or 6 ohms.

Figure 3:
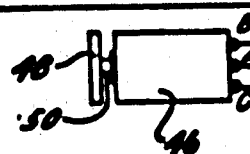
FIG. 3 is a graphical representation of the power distribution between the two phases of the circuit of FIG. 2.

It has been found that this two-phase load arrangement on a three-phase alternator provides an unequal distribution of power between the two phases. FIG. 3 shows a graphical plot of output power as a function of alternator RPM for the circuit arrangement of FIG. 2 assuming substantially equal loads of 6 ohms across the two delta legs. With the rotation of the alternator in a direction such that the phase sequence is from A to B to C, the power dissipated in the load connected across terminals A and B of the alternator is substantially twice the power dissipated in the load connected between terminals B and C even though the resistances are substantially equal. This power division means that substantially twice as much power is available for heating the combined load of one-half the windshield and the backlite in relation to the power heating the remaining half section of the windshield. This unequal distribution of power means that sufficient power is available to the windshield at a higher voltage while the voltage across the backlite can be held to a substantially low level by virtue of the relatively small voltage drop across the small series resistance of the frits 36. At the same time, the higher power dissipation in the combined loads of the backlite and half the windshield insures that there is sufficient power available to effectively de-ice both surfaces.

Figure 4:
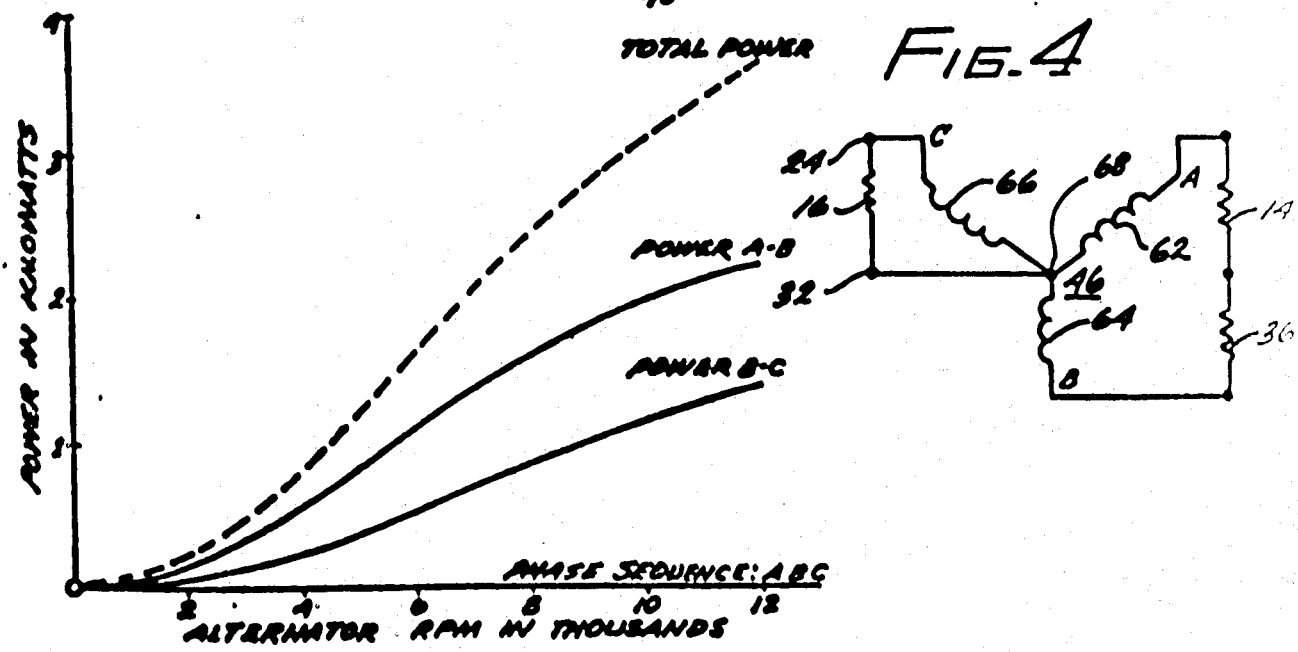
FIG. 4 is a schematic diagram of an alternative embodiment of the present invention.

An alternative circuit configuration is shown in FIG. 4. In this arrangement, the series circuit provided by the frit lines 36 and the conductive layer of section 14 are again connected as one delta leg between terminals A and B. However, the section 16 of the windshield is connected across the winding 66 as a single phase load by connecting the terminal 32 to the common or neutral point 68 of the Y-connected alternator. This hybrid connection achieves unequal power distribution by virtue of the fact that the AC voltage generated between the terminals A and B is substantially larger, by a factor of $\sqrt{3}$, than the single-phase voltage across the winding 66. In the arrangement of FIG. 4, the resistance of the frit lines is preferably somewhat larger, for example, of the order of 2 ohms, as compared to a resistance of 4 ohms for each of the windshield sections. Again the power does not divide equally but more power is available for the series circuit, representing the greater total surface area to be heated, while at the same time the voltage drop across the backlite is substantially reduced to safe levels.

Figure 5:
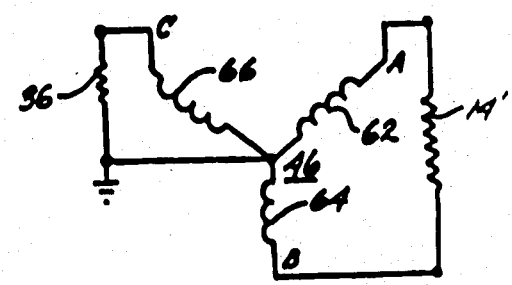
FIG. 5 is a schematic diagram similar to FIG. 4 in which the loads are arranged with the backlite as a load across one phase and the windshield is connected as a second load across the other two phases in series.

Because the single-phase voltage across the winding 66 of the Y-connected alternator of FIG. 4 is lower than the voltage between the terminals A and B of the two series connected windings 62 and 64, it is possible to connect the frit lines of the backlite as a single load across the winding 66. Even though the single-phase open circuit voltage is preferably of the order of 70 volts, the winding 66 has sufficient internal resistance to drop the output voltage below the 50 volt level when powering the backlite. FIG. 5 shows the resulting winding configuration in which the backlite 34 is connected as the load across the winding 66. Since the two halves of the windshield form the other load, the windshield need not be divided in half, but the conductive layer may extend the full width of the windshield with the buses 18 and 26 extending the full width of the windshield to form a single load 14' which is connected between the terminals A and B. This arrangement simplifies the construction of the windshield and the associated wiring since the windshield requires only a single set of electrical terminals. Assuming the typical backlite resistance of ½ to 1½ ohms, the backlite draws a substantial amount of current through the winding 66. Because of the internal resistance of the winding 66, the terminal voltage across the backlite is well below the safe limits for potential shock even though the open circuit voltage of each winding is of the order of 70 volts. The voltage across the windshield load is the combined voltage of the two windings which are out of phase by 120°. Then the voltage is $70\sqrt{3}$ volts applied to the windshield, so that the power to the windshield, which has a resistance of 3 to 6 ohms, is substantially greater than the power to the backlite.

What is claimed is:

1. An automobile defrosting system for the windshield and backlite, comprising a windshield including a transparent electrically conductive layer embedded in the windshield, the layer being interrupted along a vertical line dividing the layer into two electrically isolated sections, and bus means electrically separately connecting each section respectively across first and second pairs of terminals; a backlite including a plurality of parallel resistance heater elements extending across the backlite, and bus means connecting the heater elements in parallel across a third pair of terminals, a three-phase alternator, first conductive means connecting the set of terminals of one of said sections of the windshield conductive layer in series circuit with terminals of said backlite heating elements across one phase of the three-phase alternator, and second conducting means connecting the set of terminals of the other of said sections of the windshield conductive layer across another phase of the three-phase alternator.

2. Apparatus of claim 1 wherein the third phase of the alternator output is an open circuit.

3. Apparatus of claim 1 wherein the alternator includes three windings connected to each other at one end in a Y-connection, said series connected windshield layer section and backlite heating elements are connected between the unconnected ends of two of the windings and the other windshield layer section is connected across the ends of the third winding.

4. Apparatus of claim 1 wherein the resistance of each of the sections is substantially twice the combined resistance of the parallel connected heater elements.

5. Apparatus of claim 1 wherein the first section is positioned on the passenger side of the windshield and the second section is positioned on the driver side of the windshield.

6. Apparatus of claim 1 wherein the alternator includes three windings connected to each other at one end in a Y-connection and each winding having an outer terminal.

7. Apparatus of claim 6 wherein said first conductor means connects the first section and parallel heater elements in series across the outer terminals of one pair of the Y-connected windings of the alternator, and said second conductor means connects the second section across the outer terminals of a second pair of the Y-connected windings.

8. Apparatus of claim 7 further including means for driving the alternator in a direction such that the first phase leads the second phase.

9. Apparatus of claim 6 wherein said first conductor means connects the first section and parallel heater elements in series across the outer terminals of two of the Y-connected windings, and said second conductor means connects the second section across both ends of the third winding.

10. A window defrosting system for an automobile having window areas, comprising three electrically resistive heater means for respectively heating three separate window areas of the vehicle, one of the heater means having substantially lower resistance than the other two heater means, a three-phase alternator, electrical conducting means connecting the lowest resistance heater means in series circuit with one of the other heater means across a first phase of the alternator, electrical conducting means connecting the third heater means across a second phase of the alternator, the third phase of the alternator being an open-circuit, and means driving the alternator in a direction such that the alternating voltage of the first phase leads the alternating voltage of the second phase.

11. A defrosting system for an automobile having a windshield and a backlite, comprising: a three-phase alternator having three windings, the windings being electrically connected to each other at one end, resistance heater means for the windshield and backlite, electrical conductor means connecting a first part of the resistance heater means electrically between the ends of a first one of said windings, and electrical conductor means connecting the balance of the resistance heater means electrically between the other end of a second one of said windings and one end of a third one of said windings.

12. Apparatus of claim 11 wherein the first part of the resistance heater means includes resistance means on the backlite, and the balance of the heater means includes resistance means on the windshield.

13. Apparatus of claim 12 wherein the backlite resistance means includes a plurality of resistance frit lines and the windshield resistance means includes a transparent conductive layer.

14. Apparatus of claim 11 wherein the first part of the resistive heater means includes resistance means on the driver's side of the windshield, and the balance of the heater means includes resistance means on the other side of the windshield and resistance means on the backlite connected in series circuit.

15. Apparatus of claim 14 wherein the backlite resistance means includes a plurality of resistance frit lines and the windshield resistance means includes a transparent conductive layer.

* * * * *

UNITED STATES PATENT AND TRADEMARK OFFICE
CERTIFICATE OF CORRECTION

PATENT NO. : 3,895,213
DATED : July 15, 1975
INVENTOR(S) : BERTON P. LEVIN

It is certified that error appears in the above-identified patent and that said Letters Patent are hereby corrected as shown below:

Column 6, line 37, claim 11, delete "one" (second occurrence) and insert -- the other --.

*Signed and Sealed this*

*twenty-fourth* Day of *February 1976*

[SEAL]

Attest:

RUTH C. MASON
*Attesting Officer*

C. MARSHALL DANN
*Commissioner of Patents and Trademarks*